(12) United States Patent
Molino et al.

(10) Patent No.: US 10,564,659 B2
(45) Date of Patent: Feb. 18, 2020

(54) ELECTRIC VALVE DEVICE, PARTICULARLY FOR HOUSEHOLD ELECTRICAL APPLIANCES

(71) Applicant: ELBI INTERNATIONAL S.p.A., Turin (IT)

(72) Inventors: Giorgio Molino, Givoletto (IT); Maurizio Rendesi, Villarbasse (IT); Paolo Ravedati, Moncalieri (IT); Paolo Da Pont, Turin (IT)

(73) Assignee: ELBI INTERNATIONAL S.p.A., Turin (IT)

( * ) Notice: Subject to any disclaimer, the term of this patent is extended or adjusted under 35 U.S.C. 154(b) by 0 days.

(21) Appl. No.: 16/068,820

(22) PCT Filed: Feb. 13, 2017

(86) PCT No.: PCT/IB2017/050782
§ 371 (c)(1),
(2) Date: Jul. 9, 2018

(87) PCT Pub. No.: WO2017/137961
PCT Pub. Date: Aug. 17, 2017

(65) Prior Publication Data
US 2019/0018435 A1    Jan. 17, 2019

(30) Foreign Application Priority Data
Feb. 12, 2016   (IT) .................. 10160014688

(51) Int. Cl.
*G05D 23/19* (2006.01)
*F16K 1/44* (2006.01)

(52) U.S. Cl.
CPC ......... *G05D 23/1921* (2013.01); *F16K 1/443* (2013.01)

(58) Field of Classification Search
CPC ....... F16K 1/44; F16K 1/443; G05D 23/1021; G05D 23/1921
(Continued)

(56) References Cited

U.S. PATENT DOCUMENTS 3,344,807 A * 10/1967 Lehrer et al. ............. F16K 1/34
137/312
4,376,447 A *  3/1983 Chumley .................. F16K 1/42
137/244

(Continued)

FOREIGN PATENT DOCUMENTS

DE   10 2004 004 708 B3   4/2005
JP      2007-032701 A     2/2007

OTHER PUBLICATIONS

International Search Report for PCT/IB2017/050782 dated Jul. 12, 2017 [PCT/ISA/210].

Primary Examiner — Kevin L Lee
(74) Attorney, Agent, or Firm — Sughrue Mion, PLLC

(57) ABSTRACT

An electric valve device (1) for household appliances, includes a hollow body (2) with an inlet (4, 5) and an outlet (5, 4) for a flow of a liquid, between which in the body (2) there is defined a chamber (6) wherein a first valve seat (7) is provided, a (first) obturator (17) moveably mounted in the chamber (6) and cooperating with the first seat (7) for controlling the communication between the inlet (4, 5) and the outlet (5, 4), and a movable member (12) coupled with the obturator (17) and displaceable towards and away from the first valve seat (7) and controlled by means of an electrically operable actuator (10) carried by said body (2). In the body (2) a second valve seat (8) is staggered with respect to the first valve seat (7) along the direction of displacement of the first obturator (7), to which is connected a second obturator (18) displaceable from and towards the second valve seat (8). The arrangement is such that the
(Continued)

obturators (17, 18) are jointly displaceable away from and towards the corresponding seats (7, 8), with which they define a first and respectively, second valve, fluidically in series with one another, and both controllable through said electrically operable actuator.

8 Claims, 8 Drawing Sheets

(58) Field of Classification Search
USPC .................................. 251/129.15; 137/624.11
See application file for complete search history.

(56) References Cited

U.S. PATENT DOCUMENTS

| | | | | |
|---|---|---|---|---|
| 6,047,718 | A * | 4/2000 | Konsky et al. | F16K 1/443 |
| | | | | 137/1 |
| 6,959,718 | B2 * | 11/2005 | Kayahara et al. | F16K 1/36 |
| | | | | 137/15.01 |
| 7,905,254 | B2 * | 3/2011 | Takeda et al. | F16K 1/443 |
| | | | | 137/630 |
| 8,632,050 | B2 * | 1/2014 | Stoeckel et al. | F16K 31/0634 |
| | | | | 251/129.15 |
| 2003/0098074 | A1 | 5/2003 | Kayahara et al. | |
| 2005/0279956 | A1 | 12/2005 | Berger et al. | |
| 2011/0240986 | A1 * | 10/2011 | Tsai et al. | H01L 27/124 |
| | | | | 257/43 |
| 2012/0223634 | A1 * | 9/2012 | Dinkel et al. | F01L 9/02 |
| | | | | 123/90.12 |
| 2013/0312730 | A1 * | 11/2013 | Stark | G05D 16/2013 |
| | | | | 126/116 A |

\* cited by examiner

ELECTRIC VALVE DEVICE, PARTICULARLY FOR HOUSEHOLD ELECTRICAL APPLIANCES

CROSS REFERENCE TO RELATED APPLICATIONS

This application is a National Stage of Application No. PCT/IB2017/050782 filed Feb. 13, 2017, claiming priority based on Italian Patent Application No. 102016000014688 filed Feb. 12, 2016.

BACKGROUND OF THE INVENTION

Field of the Invention

The present invention relates to an electric valve device, used in particular, but not solely, in household appliances, such as washing machines or dishwashers.

More specifically, the invention relates to an electric valve device of the type comprising
- a hollow body with an inlet and an outlet for a flow of fluid, in particular a liquid, between which, in said body, a chamber is defined wherein a (first) valve seat is provided,
- a (first) obturator moveably mounted in said chamber and cooperating with said (first) seat to control the communication between the inlet and the outlet, and
- a moveable member coupled with said (first) obturator and displaceable towards and away from said (first) valve seat and arranged to be controlled by means of an electrically operable actuator, such as a solenoid or a wax actuator, carried by said body.

Background

In such an electric valve device, it may happen that particles, impurities and other granules carried by the liquid become "pinched" between the obturator and the associated valve seat. When this occurs, the hydraulic seal between the obturator and the seat may become distorted, and there may be undesired leakage of liquid.

One object of the present invention is to provide an electric valve device adapted to overcome the drawback outlined above of solenoid valve devices according to the prior art.

SUMMARY OF THE INVENTION

This and other objects are achieved according to the invention with an electric valve device of the initially defined type, characterized primarily in that in said body, a second valve seat is formed, staggered with respect to said first valve seat along the direction of displacement of the first obturator, and in that said first obturator is connected to a second obturator displaceable from and towards said second valve seat;
the arrangement being such that said first and second obturators are jointly displaceable away from and towards the corresponding seats, with which they define a first and respectively a second valve fluidically in series with one another, both controllable through said electrically operable actuator.

BRIEF DESCRIPTION OF THE DRAWINGS

Further features and advantages of the invention will become apparent from the detailed description that follows, provided by way of non-limiting example with reference to the accompanying drawings, in which.

DETAILED DESCRIPTION OF THE INVENTION

Figure 1:
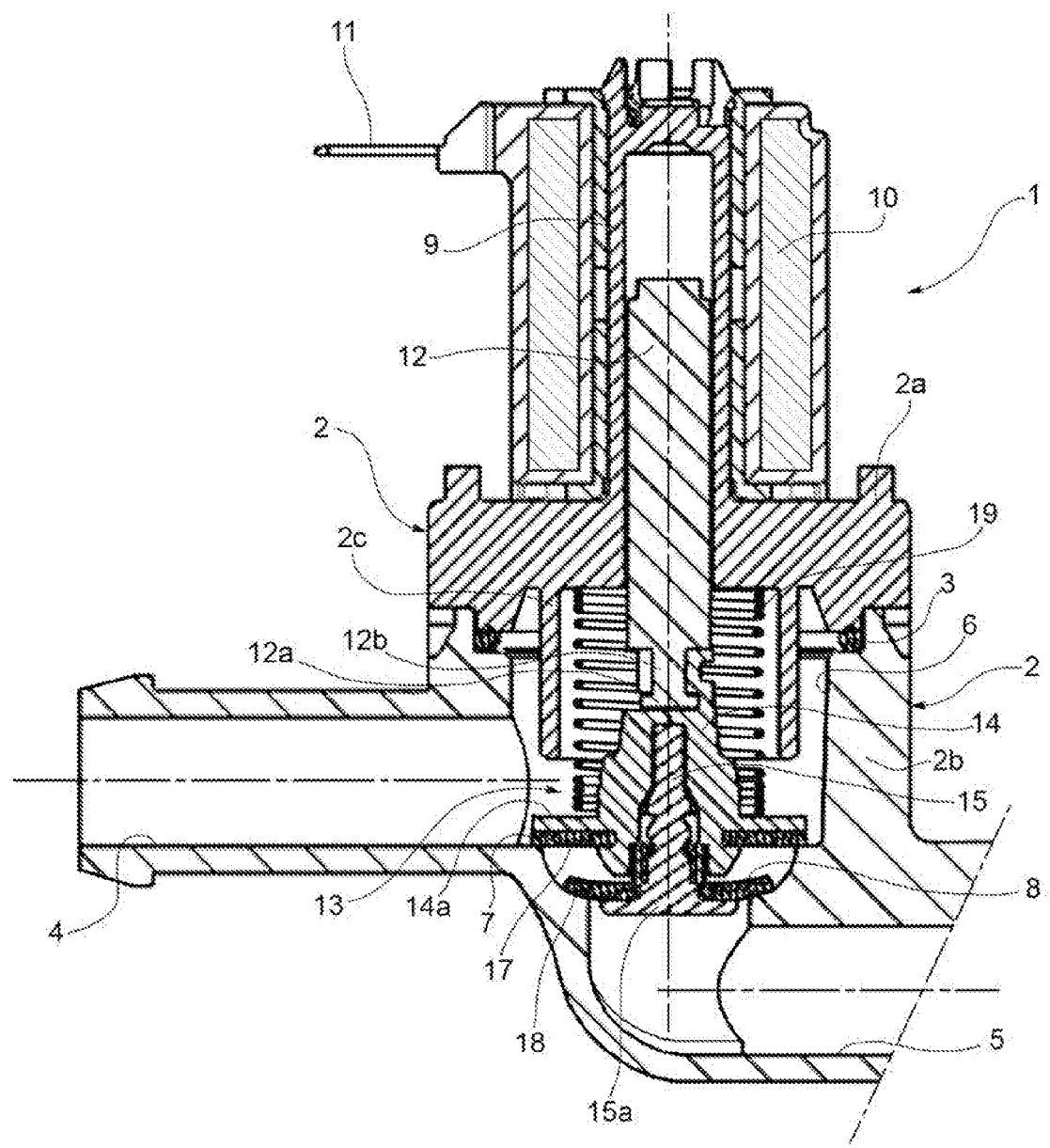
FIG. 1 is a partial sectional view of an electric valve device according to the present invention, shown in the closed condition.
Figure 2:
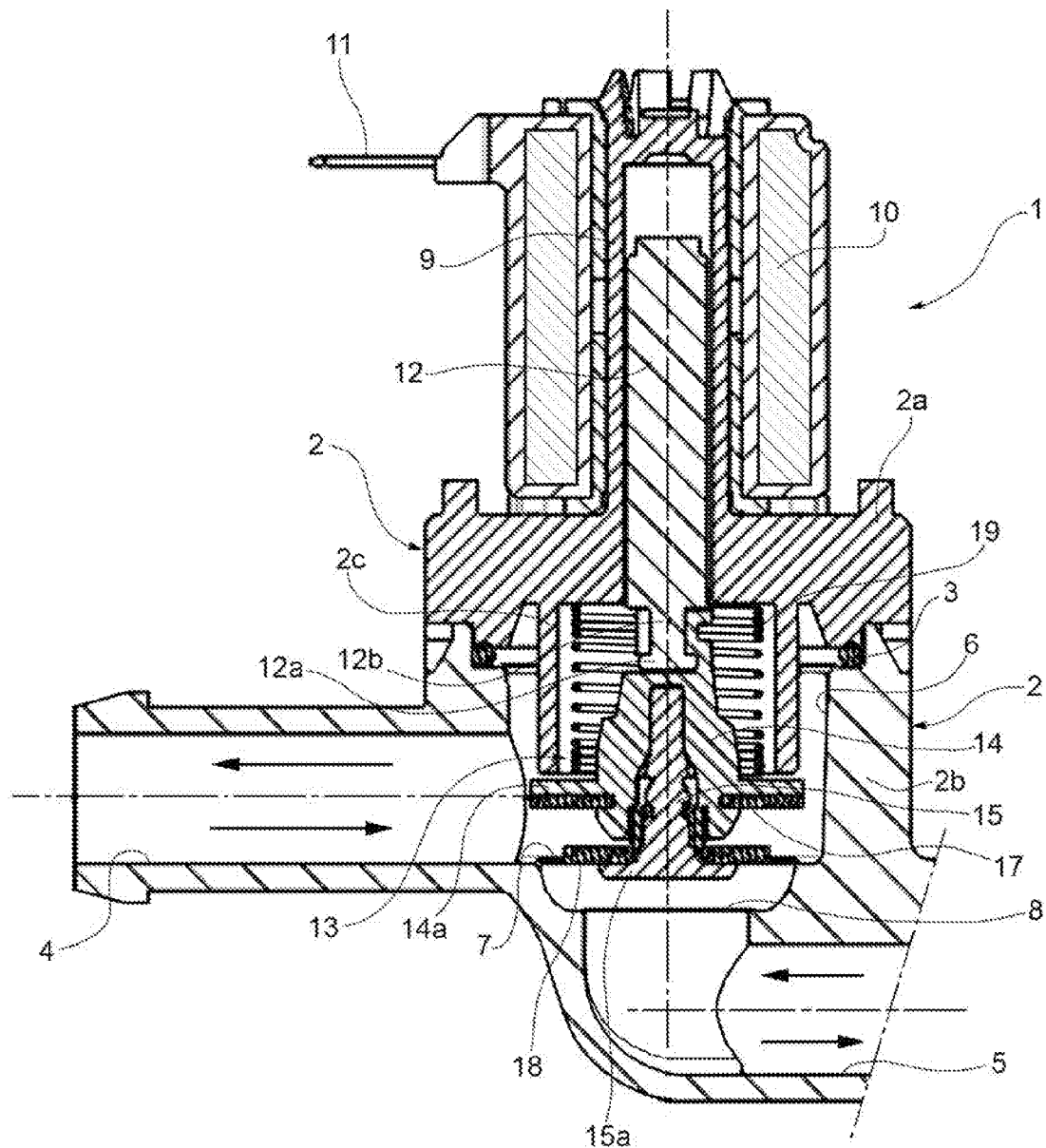
FIG. 2 is a partial sectional view showing the electric valve device of FIG. 1 in the open condition.

In FIGS. 1 and 2, an electric valve device according to the present invention is indicated collectively at 1.

This electric valve device comprises a hollow body, indicated collectively at 2, which in the exemplary embodiment illustrated comprises an upper element 2a and a lower element 2b, coupled together in a liquid-tight seal by the interposition of a sealing O-ring 3.

The 2nd and 3rd elements may be made for example of a molded plastic material.

The body 2 has two conduits 4 and 5, which may serve either as input or output for a flow of fluid, especially a liquid.

Between these conduits 4, 5, in the body 2 a chamber 6 is formed.

As better seen in FIG. 2, in the chamber 6, an upper valve seat 7 and a lower valve seat 8 are made with vertical space left between them.

Preferably, although not necessarily, the seats 7 and 8 are coaxial with each other.

In the illustrated embodiment, the seats 7 and 8 are both made in the lower element 2b of the body 2.

In the upper element 2a of this body, a tubular formation 9 is made, which extends essentially upwards, coaxial with the seats 7 and 8. The upper end of the tubular formation 9 is closed, while the lower end is open and opens into the chamber 6.

Around the tubular formation 9 of the body 2, a control coil or solenoid 10, made in a manner known per se with insulated electric wire, is mounted in a fixed position. The leads of this coil or solenoid are connected to respective terminals 11 (only one of which is visible in the drawings), for example in the form of lamellar plugs, for connection to a control circuit (not shown).

In the embodiment according to FIGS. 1 and 2, inside the chamber 6, a tubular extension 2c extends from the lower element 2a of the body 2.

Inside the tubular portion 9 of the element 2a of the body 2, a ferromagnetic member 12 of a substantially cylindrical general shape is mounted in a vertically movable manner.

The lower end of the member 12 forms a terminal head 12a, joined to the rest of the member 12 by a portion of reduced diameter, in the form of a neck, 12b.

Above the terminal head 12a and around the neck 12b of the member 12, the upper end of an obturator assembly indicated collectively at 13 is attached.

In the embodiment illustrated in FIGS. 1 and 2, the obturator assembly 13 comprises an upper body 14, the upper end of which is attached to the neck 12b of the member 12, and the lower end of which has an axial cavity directed upwards, in which the upper end of a second body 15 is planted by force, protruding downward in the direction of the conduit 5.

The body 14 in its intermediate portion has a protrusion 14a which extends radially outwards in the manner of a flange. Immediately below this formation 14a, the body 14 has a peripheral annular groove in which a sealing ring member 17 in the form of a flat ring is engaged and held, intended to cooperate operationally, in the manner of an obturator, with the upper valve seat 7.

The lower distal end of the body 15 has a terminal formation 15a projecting radially outward.

Around an intermediate portion of the body 15 and above its terminal formation 15a, a second sealing element 18 is engaged, intended to cooperate in the manner of an obturator, with the lower valve seat 8.

Inside the tubular element 2c of the body 2, a helical spring 19 is interposed between said body 2 and the flange-like formation 14a of the body 14 which tends to push down the assembly formed by the member 12 and by the obturator assembly 13, towards the position of FIG. 1, in which the obturators 17 and 18 obstruct the valve seats 7 and 8 associated with them respectively.

Preferably, in this condition, the obturator 18 is elastically deformed upward, as a result of its engagement with the valve seat 8, so as to be resiliently loaded against this seat. Consequently, if granules are "pinched" between the obturator 17 and the associated valve seat 7 so as to keep the assembly formed by the member 12 and the obturator assembly 13 slightly raised with respect to the nominal closed position of FIG. 1, the obturator 18 is still able to ensure an effective sealing action against the associated valve seat 8.

Appropriately, the radial extension 17 of the obturator is such that its support surface against the associated valve seat 7 is lower than the extension of the contact surface between the obturator 18 and the associated valve seat 8. In this way, the probability that granules may be pinched between the obturator 17 and the valve seat 7 is reduced.

In the de-energized condition of the control coil or solenoid 10, the electric valve device 1 assumes the closed condition illustrated in FIG. 1.

When an electric current is made to circulate in the coil or solenoid 10 in a predetermined direction, the magnetic field correspondingly developed attracts the member 12 towards the other and the obturator assembly 13 connected to it, against the action of the helical spring 19, which becomes compressed. The electric valve device 1 switches into the open condition shown in FIG. 2, in which both obturators 17 and 18 are far from the corresponding valve seats 7 and 8, and a liquid flow is allowed between the conduits 4 and 5.

When the passage of current in the coil or solenoid 10 is interrupted, the assembly formed by the member 12 and the obturator assembly 13 returns to the closed condition of FIG. 1, under the action of the spring 19.

With reference to FIG. 2, in the open condition of the electric valve device, the flange-like formation 14a of the obturator assembly 13 appropriately engages the lower end of the tubular appendage 2c of the body 2. In this way, the exposure of the helical spring and the member 12 to the flowing fluid is limited between the conduits 4 and 5.

The electric valve device 1 described above with reference to FIGS. 1 and 2 allows effectively overcoming the drawback of the devices according to the prior art, outlined in the introduction of the present description.

Figure 3:
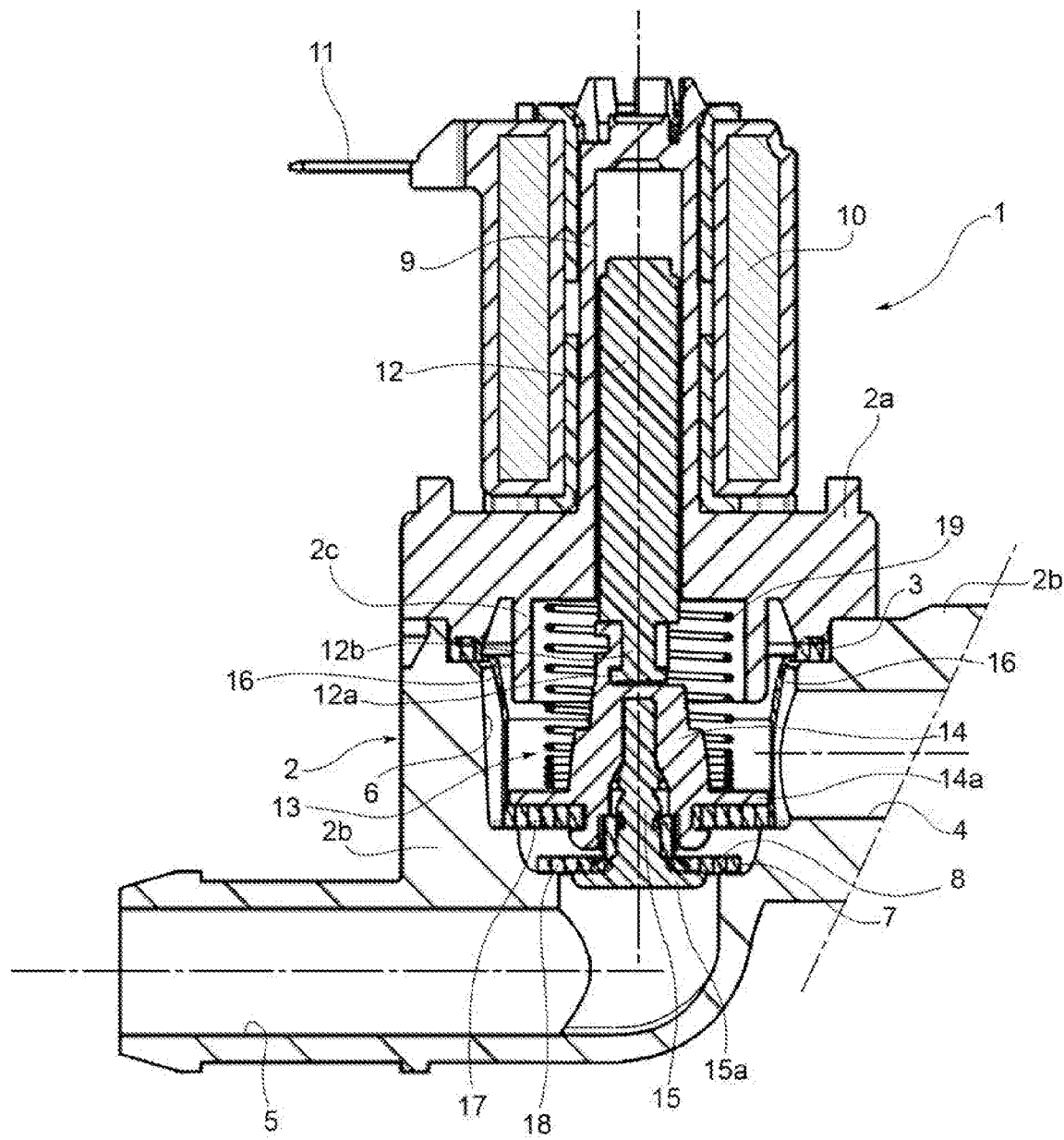
FIG. 3 is a partial sectional view of another electric valve device according to the present invention, shown in the closed condition.
Figure 4:
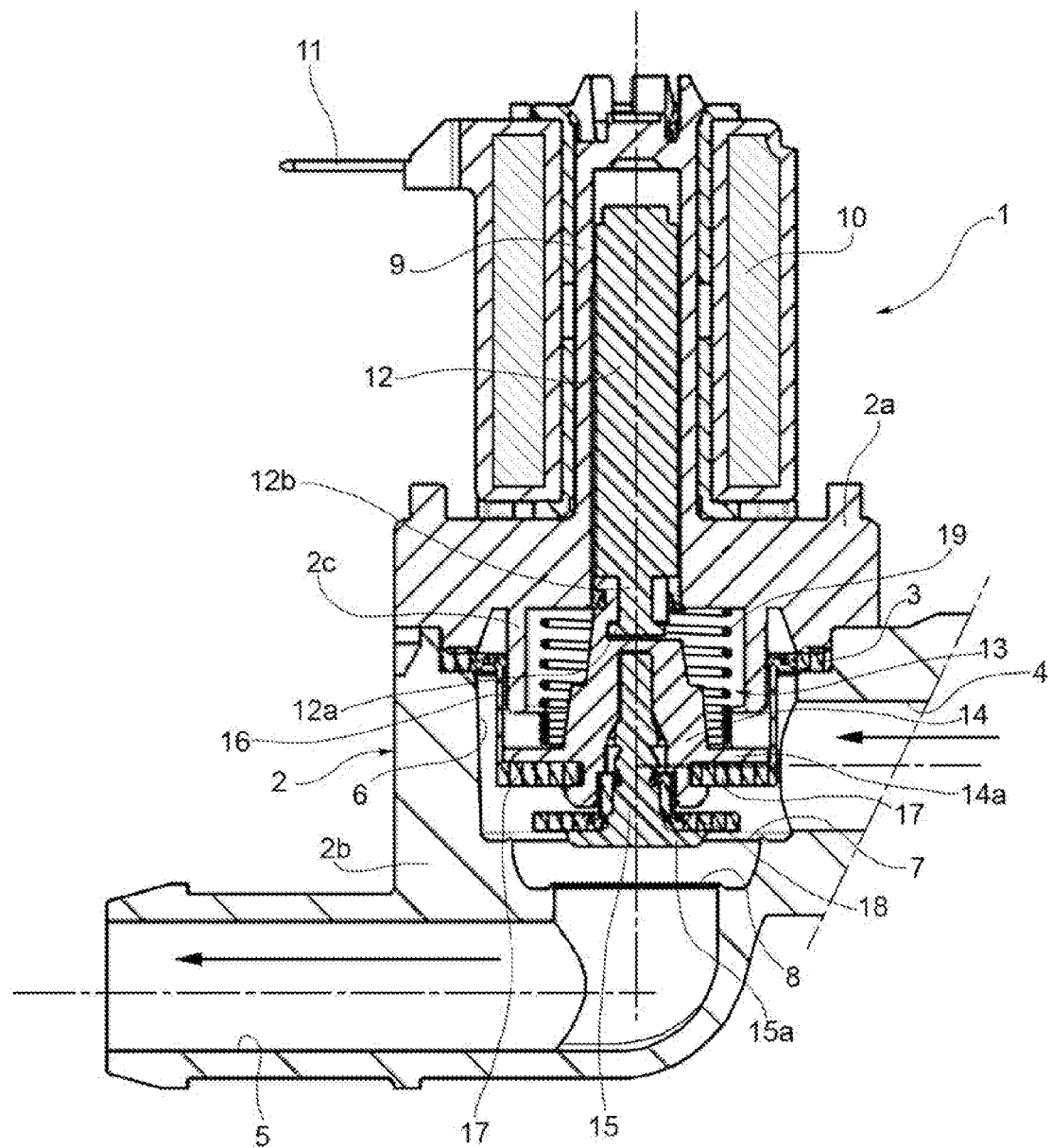
FIG. 4 is a partial sectional view showing the electric valve device of FIG. 3 in the open condition.

FIGS. 3 and 4 illustrate an alternative embodiment.

In these figures, parts and elements identical or functionally similar to parts and elements already described have been again attributed the same reference numbers used previously.

The variant according to FIGS. 3 and 4 differs from the embodiment according to FIGS. 1 and 2 essentially in that the periphery of the obturator 17 is made integral with an elastically flexible and extensible tubular bellows 16 and with the annular gasket 3 locked between the elements 2a and 2b of the body 2 of the electric valve device. In other words, the gasket 3, the bellows 16 and the obturator 17 are appropriately formed as a single element of a suitable material, for example elastomeric material. Such elastomeric material element allows permanently protecting the helical spring 19 and the member 12 from the flowing fluid, with the electric valve device 1 open, between the conduits 4 and 5.

Figure 5:
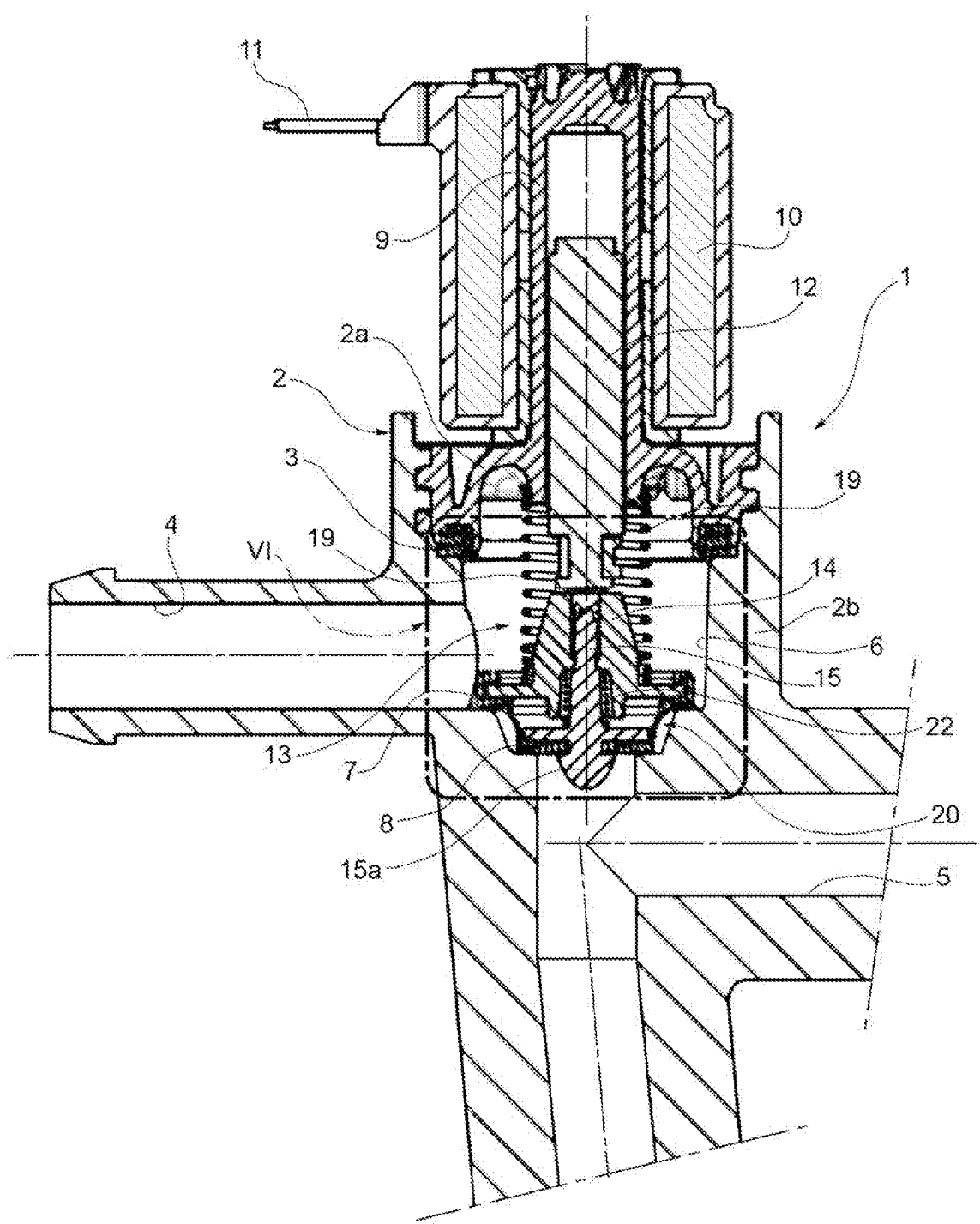
FIG. 5 is a partial sectional view of another electric valve device according to the present invention.
Figure 6:
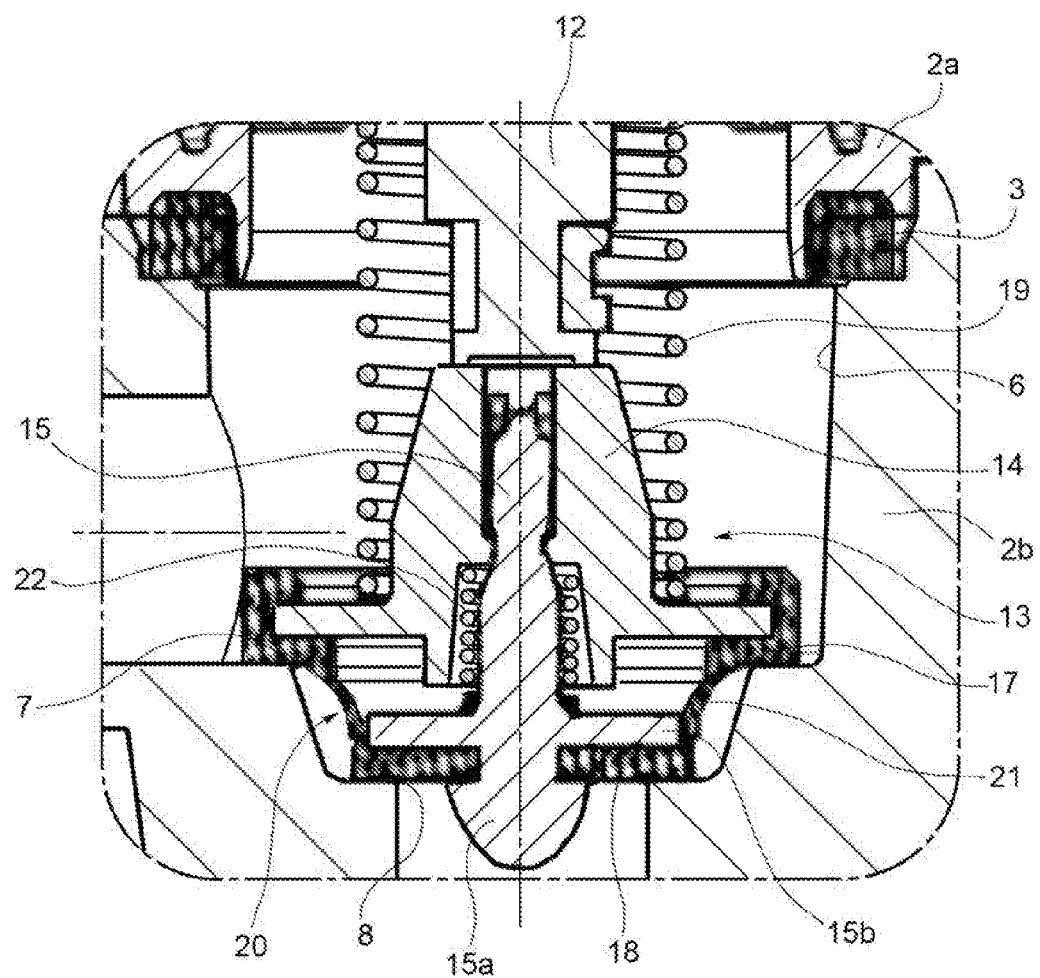
FIG. 6 is an enlarged view of the portion of FIG. 5 indicated by the arrow VI.
Figure 7:
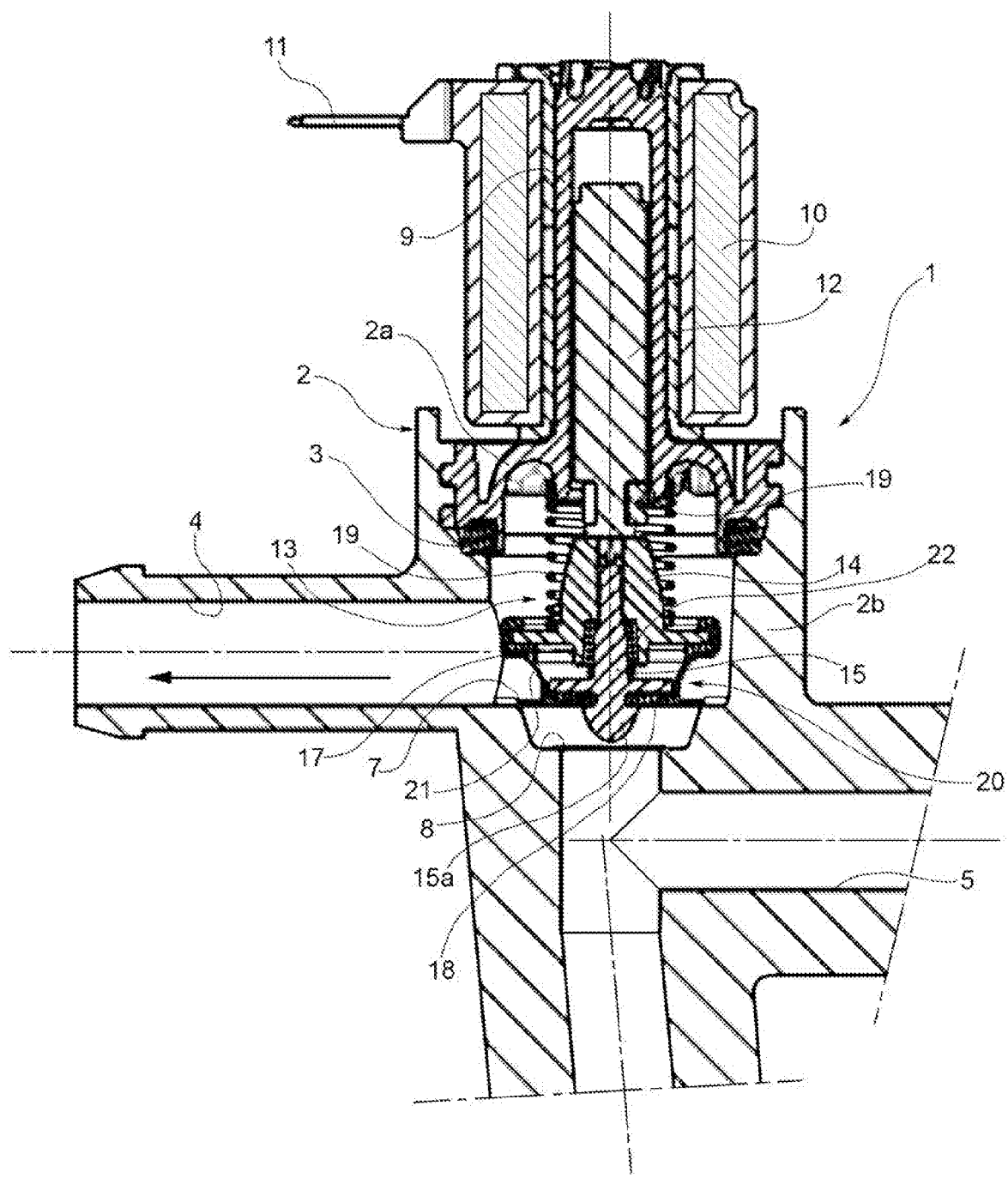
FIG. 7 is a partial sectional view showing the electric valve device according to FIGS. 5 and 6 in the open condition.

FIGS. 5 to 7 illustrate a further variant of embodiment.

Also in these figures, parts and elements identical or functionally similar to parts and elements already described have been attributed the same reference numbers used previously.

In the variant according to FIGS. 5 to 7, the obturators 17 and 18, respectively associated with the valve seats 7 and 8, are integrated in a single annular element 20 of elastomeric material. Such element 20 comprises in particular an elastically flexible and extensible intermediate portion 21 that interconnects between the obturators 17 and 18 (see in particular FIG. 6).

In addition, in the obturator assembly 13, the lower body 15 is mounted in an axially moveable manner relative to the upper body 14, and a helical spring 22 is interposed therebetween and tends to propel the body 15 away and downward, relative to the body 14.

This solution allows ensuring adequate sealing between the obturator 18 and the associated valve seat 8 also in the case wherein, by the effect of pinching granules between the obturator 17 and the associated valve seat 7, the obturator assembly 13 should be slightly raised with respect to the nominal closed position.

To better support the lower portion of the elastomeric element 20 or the obturator 18, the body 15 is made with a terminal head 15a and an overlying formation 15b, protruding radially outward in the manner of a flange, and the obturator 18 is inserted in the groove defined therebetween.

For the rest, in the embodiment according to FIGS. 5 to 7, the electric valve device 1 operates substantially as in the embodiments described in relation to the previous figures.

Figure 8:
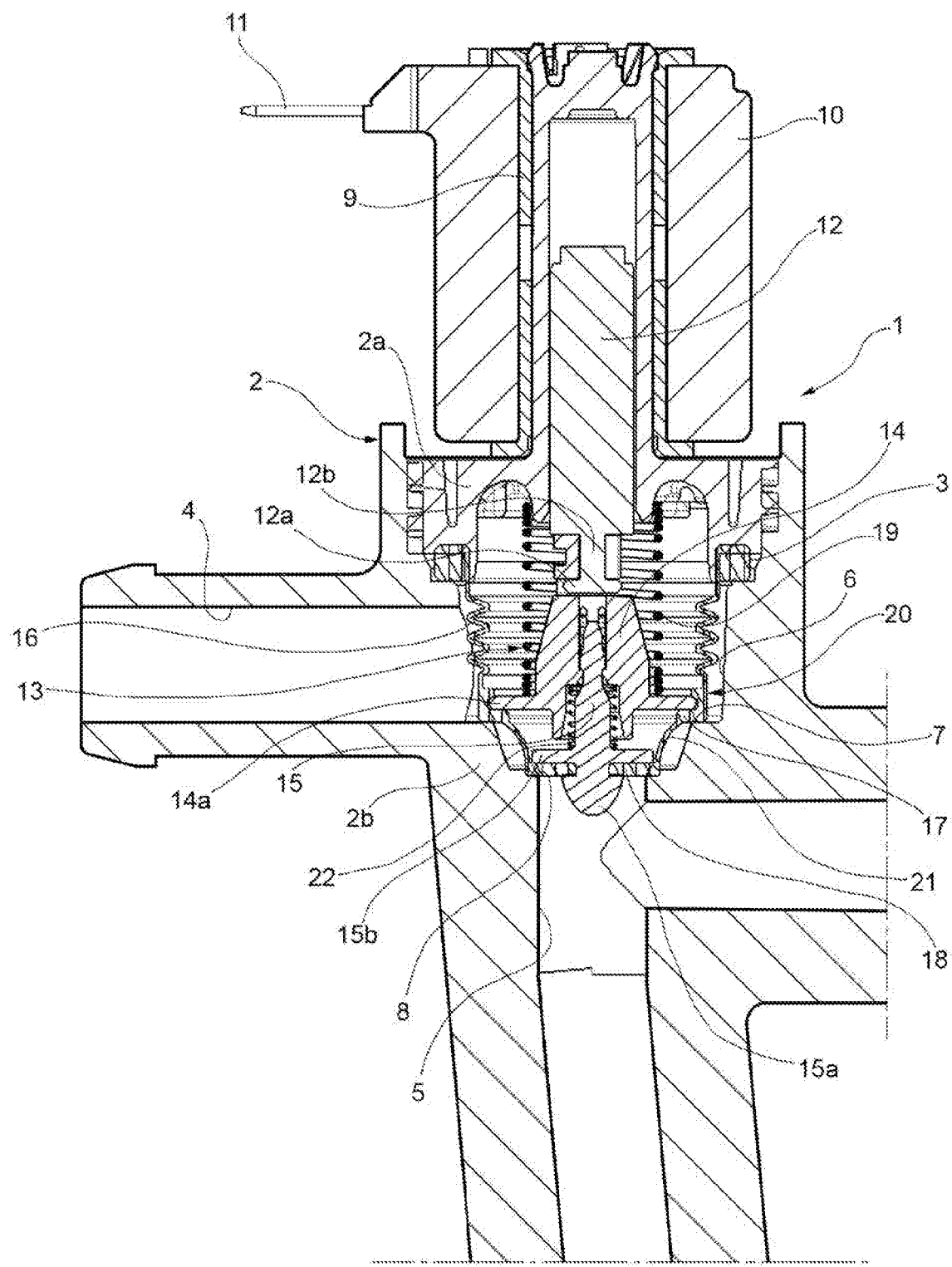
FIG. 8 is a partial sectional view of another electric valve device according to the present invention.

FIG. 8 illustrates a further variant of embodiment.

Also in this figure, parts and elements identical or functionally similar to parts and elements already described have been attributed the same reference numbers used previously.

The variant of FIG. 8 corresponds to the variant of FIGS. 5 to 7 in that the obturators 17 and 18, respectively associated with the valve seats 7 and 8, are integrated in a single annular element 20 of an elastomeric material and corresponding to the variant of FIGS. 3-4 in that that the periphery of the obturator 17 is integrated with an elastically flexible and extensible tubular bellows 16 and with the annular gasket 3, locked between the elements 2a and 2b of the body 2 of the electric valve device. In this variant, therefore, the element 20 is constituted of a single body of elastomeric material, which integrates the obturator 17 and 18, the intermediate portion 21 that interconnects them, the gasket 3 and the bellows 16 that connects the gasket 3 to the obturators.

For the rest, in the embodiment according to FIG. 8, the electric valve device 1 operates substantially as in the embodiments described in relation to the previous figures.

According to embodiments which provide for deformability of the second obturator 17 and/or the helical spring 22 interposed between the lower body 15 and the upper body 14 of the obturator group 13, it is possible to configure the first obturator 17 and the second obturator 18 such that the first obturator 17 closes and/or opens the associated first valve seat 7 and the second obturator 18 respectively closes and/or opens the associated second valve seat (8) in a manner temporally staggered one with respect to the other.

Such configuration allows, with a repeated activation of the closing valve, a "self-cleaning" effect of the valve seat 7 or 8 to be achieved, through the removal of any particles which become lodged on the valve seat and compromise its seal.

Furthermore, in the versions with integrated gasket and/or obturator of FIGS. 3 through 8, such configuration allows a "pumping" function to dislodge any residues from the seats and remove them by activating the valve in a repeated way. This type of activation allows for example for the closure of first the second seat 8 and then the first seat 7 to be achieved, pushing away the water and any impurities present in the volume between the two seats; a subsequent opening will then open first the second seat 8 then the first seat 7, generating a "piston pump" effect that allows any dirt from the seats to be removed.

Naturally, without altering the principle of the invention, the embodiments and the details of construction may vary widely with respect to those described and illustrated purely by way of non-limiting example, without thereby departing from the scope of the invention as defined in the appended claims.

The invention claimed is:

1. An electric valve device comprising:
   a hollow body with an inlet and an outlet for the flow of a fluid between which in said body there is defined a chamber wherein a first valve seat is provided,
   a first obturator moveably mounted in said chamber and cooperating with said first valve seat for controlling the communication between the inlet and the outlet, and
   a movable member coupled with said first obturator and displaceable towards and away from said first valve seat and arranged to be controlled by means of an electrically operable actuator carried by said body;
   wherein in said body there is provided a second valve seat staggered with respect to said first valve seat along the direction of displacement of said first obturator,
   wherein to said first obturator there is connected a second obturator displaceable towards and away from said second valve seat,
   wherein said first and second obturators are jointly displaceable away from and towards the corresponding seats, with which they define a first valve and a second valve, respectively, fluidically in series with one another, both controllable through said electrically operable actuator,
   wherein said first obturator has an associated resilient member tending to urge said first obturator towards the associated valve seat, said resilient member being housed within a cavity defined by said body and open towards said first obturator, and
   wherein said first obturator has an associated bearing member adapted to close said cavity when said first obturator is in an opening position.

2. The electric valve device according to claim 1, wherein said second obturator is formed such that, with respect to said first obturator, when the first obturator closes the first valve seat associated therewith, the second obturator closes the second valve seat associated therewith assuming a resiliently deformed configuration such that said second obturator is resiliently loaded against the associated second seat.

3. The electric valve device according to claim 1, wherein the body comprises two portions fastened to one another with the interposition of a sealing member made in one piece and coupled with said first obturator, such as to prevent the contact of said fluid with said movable member and with resilient member arranged to urge said first obturator towards the associated first valve seat.

4. The electric valve device according to claim 1, wherein said first and second obturators are separate and distinct from one another.

5. The electric valve device according to claim 1, wherein the contact surface area of said obturators with the associated valve seats are different from one another.

6. The electric valve device according to claim 1, wherein said first obturator and second obturator are configured in such a way that the first obturator closes and/or opens the associated first valve seat and the second obturator respectively closes and/or opens the associated second valve seat in a manner temporally staggered relative to one another.

7. An electric valve device comprising:
   a hollow body with an inlet and an outlet for the flow of a fluid between which in said body there is defined a chamber wherein a first valve seat is provided;
   a first obturator moveably mounted in said chamber and cooperating with said first valve seat for controlling the communication between the inlet and the outlet; and
   a movable member coupled with said first obturator and displaceable towards and away from said first valve seat and arranged to be controlled by means of an electrically operable actuator carried by said body,
   wherein in said body there is provided a second valve seat staggered with respect to said first valve seat along the direction of displacement of said first obturator,
   wherein to said first obturator there is connected a second obturator displaceable towards and away from said second valve seat,
   wherein said first and second obturators are jointly displaceable away from and towards the corresponding seats, with which they define a first valve and a second valve, respectively, fluidically in series with one another, both controllable through said electrically operable actuator, and
   wherein said first and second obturators are connected with respective support bodies which are slidable with respect to one another and having a resilient member interposed therebetween, tending to move one away from the other, said first and second obturators being integral with a body including an intermediate junction portion which is resiliently flexible and extensible.

8. The electric valve device according to claim 7, wherein the body is made in two portions fastened to one another with the interposition of a sealing member made in one piece and coupled with said first obturator and second obturator, such as to prevent the contact of said fluid with said movable member and with resilient means arranged to urge said first obturator towards the associated first valve seat.

* * * * *